United States Patent
Hamman et al.

(10) Patent No.: US 8,870,084 B2
(45) Date of Patent: Oct. 28, 2014

(54) METHOD AND SYSTEM FOR THE GENERATION AND VALIDATION OF PERSONAL IDENTIFICATION NUMBERS

(75) Inventors: Robert D. Hamman, Dallas, TX (US); William Kennedy, III, Dallas, TX (US); Jay B. Ross, Lambertville, NJ (US)

(73) Assignee: SCA Promotions, Dallas, TX (US)

( * ) Notice: Subject to any disclaimer, the term of this patent is extended or adjusted under 35 U.S.C. 154(b) by 50 days.

(21) Appl. No.: 13/483,924

(22) Filed: May 30, 2012

(65) Prior Publication Data
US 2013/0062420 A1 Mar. 14, 2013

Related U.S. Application Data

(60) Provisional application No. 61/573,863, filed on Sep. 13, 2011.

(51) Int. Cl.
*G06K 19/06* (2006.01)
*H04L 9/08* (2006.01)
*G06Q 20/38* (2012.01)
*G06Q 20/40* (2012.01)

(52) U.S. Cl.
CPC .......... *G06Q 20/3823* (2013.01); *H04L 9/0869* (2013.01); *G06Q 20/4012* (2013.01); *G06Q 20/385* (2013.01); *H04L 9/0866* (2013.01)
USPC .......................................... 235/494; 235/380

(58) Field of Classification Search
CPC ................................ G06K 5/00; G06K 19/06
USPC .................................. 235/494, 380, 382
See application file for complete search history.

(56) References Cited

U.S. PATENT DOCUMENTS

| | | | | |
|---|---|---|---|---|
| 5,258,999 A | * | 11/1993 | Wernimont et al. | 375/220 |
| 6,055,500 A | * | 4/2000 | Terui et al. | 704/270 |
| 6,370,324 B1 | * | 4/2002 | Kawahara et al. | 386/202 |
| 6,750,917 B2 | * | 6/2004 | Yamada et al. | 348/478 |
| 8,126,145 B1 | * | 2/2012 | Tewari et al. | 380/255 |

* cited by examiner

*Primary Examiner* — Daniel St. Cyr
(74) *Attorney, Agent, or Firm* — Meagher Emanuel Laks Goldberg & Liao, LLP

(57) ABSTRACT

A method and apparatus for encoding and decoding sequential index numbers to pseudo-random Personal Identification Codes (PINs) of varying word size in disclosed. The word size is defined by a word size control variable. The encoding and decoding process utilizes a symmetric, secret key, block encryption/decryption method. The index numbers are encrypted and the output result produces the PIN numbers. The encryption process may be reversed to a decryption process using a mode control input. When reversed to decryption, the PIN numbers are translated back into the original index numbers utilizing the same secret key for encryption. The block size of the encryption/decryption method is matched to the word size control variable. The word size defines the maximum number of index number/PIN code pairs. There is a one-to-one correspondence between a single index number and the resulting PIN number, thus forming a unique ordered pair.

20 Claims, 27 Drawing Sheets

88

158

$$A_N * 27_{(10)}^{N} + A_{N-1} * 27_{(10)}^{N-1} + \cdots + A_1 * 27_{(10)}^{1} + A_0 * 27_{(10)}^{0}$$

Conversion from Base 27 to Base 10 Example:

$$Base_{27} = C5PVZ \quad \longleftarrow 160$$

$$= C_{(27)} * 27_{(10)}^{4} + 5_{(27)} * 27_{(10)}^{3} + P_{(27)} * 27_{(10)}^{2} + V_{(27)} * 27_{(10)}^{1} + Z_{(27)} * 27_{(10)}^{0}$$

$$= C_{(27)} * 531441 + 5_{(27)} * 19683 + P_{(27)} * 729 + V_{(27)} * 27 + Z_{(27)} * 1$$

$$= 1 * 531441 + 22 * 19683 + 11 * 729 + 15 * 27 + 19 * 1$$

$$= 531441 + 433026 + 869 + 405 + 19$$

$$Base_{10} = 965760$$

Converting a Base 2 number to a Base 27 Number

General relationship: $X = Y^Z$ ← 164

Therefore:

$$2^N = 27^Z$$

or $$Z = N * \left( \frac{Log(2)}{Log(27)} \right)$$ ← 166

Example: $N = 16$ $$Z = 16 * \left( \frac{.301029995}{1.431363764} \right)$$ ← 168

$Z = 3.36495$   Z must be an integer, therefore round up to 4

$Base\ 2^{16} = 65536_{(10)} = FL7K_{(27)}$ ← 170

Figure 22

METHOD AND SYSTEM FOR THE GENERATION AND VALIDATION OF PERSONAL IDENTIFICATION NUMBERS

CROSS-REFERENCE TO PRIOR FILED APPLICATIONS

This application claims priority to earlier filed U.S. provisional application No. 61/573,863 filed Sep. 13, 2011, which is incorporated herein in its entirety.

FIELD OF INVENTION

The present invention relates to methods, system and apparatus for generating and validating Personal Identification Codes (PINs) using a cryptographic technique suitable for applications such as electronic banking, gaming systems, promotional systems, and security systems. More particularly, the methods, system and apparatus allows for the generation of PINs that can be determined to be within a subgroup of target values. Moreover, the invention provides the ability to validate a PIN using digital signatures as well as retired from use using a bit vector method.

BACKGROUND

A personal identification number (PIN) is a secret numeric or alpha-numeric password or identifier shared between a user and a system that may be used to authenticate or validate the user to the system. Typically, the user provides a non-confidential user identifier (ID) and a confidential PIN to gain access to the system. Upon receiving the user ID and PIN, the system looks up the PIN based upon the user ID and compares the looked-up PIN with the received PIN. The user is granted access only when the entered PIN matches with the PIN stored in the system. PINs are often used for automated teller machines (ATMs) as well as the point of sale for debit cards and credit cards. PINs are also used in gaming and promotional applications for prize awarding. Apart from financial uses, GSM mobile phones may also allow the user to enter a PIN of between 4 and 8 digits. The PIN is recorded in the SIM card. PIN management and security may be covered by one or more standards such as ISO 9564-1.

There are several well-known methods for generating a PIN number. For example, the IBM method may be used to generate what is termed a natural PIN. The natural PIN is generated by encrypting the primary account number (PAN), using an encryption key generated specifically for the purpose. This key is sometimes referred to as the PIN generation key (PGK). To validate the PIN, the issuing bank regenerates the PIN using the above method, and compares this with the entered PIN. Natural PINs cannot be user selectable because they are derived from the PAN. If the card is reissued with a new PAN, a new PIN must be generated.

A Variation of the IBM method is to store a PIN offset value. The Offset is found by subtracting natural PIN from the customer selected PIN using modulo 10. The offset may be stored either on in card track data, or in a database at the card issuer. To validate the PIN, the issuing bank calculates the natural PIN as set out above, then adds the offset and compares this value to the entered PIN.

The VISA method is used by many card schemes. The VISA method generates a PIN verification value (PVV). Similar to the offset value, it may be stored on the card's track data, or in a database at the card issuer. This is called the reference PVV. The rightmost 11 digits of the PAN excluding the checksum value, a PIN validation key index (PVKI, chosen from 1 to 6) and the required PIN value are used to make a 64 bit number. The PVKI selects a validation key (PVK, of 128 bits) to encrypt this number. From this encrypted value, the PVV is found. To validate the PIN, the issuing bank calculates a PVV value from the entered PIN and PAN and compares this value to the reference PVV. If the reference PVV and the calculated PVV match, the correct PIN was entered. Unlike the IBM method, the VISA method doesn't derive a PIN. The PVV value is used to confirm the PIN entered at the terminal and was also used to generate the reference PVV. The PIN used to generate a PVV can be randomly generated or user selected or even derived using the IBM method.

SUMMARY

It is the object of the present invention to facilitate the generation of Personal Identification Numbers or PINs. The PIN generation process insures there will be no duplication of Random PIN code values, and provides for an efficient method to verify that a specific target group of PINs are easily detectable. Incorporated into the PIN generation process is a control parameter that defines the binary word size of the PIN. More particularly, the present invention incorporates a coding methodology that provides for a method to verify if a PIN code was originally generated by the system to counteract entry "spoofing". Additionally a non-database solution is incorporated to track the use of the PIN number. The PIN number may be encoded using different base numbers to reduce the resulting character count. The PIN number may be also encoded using BAR codes or QR coding methods.

The PIN generation method converts a plurality of non-repeating index numbers, e.g., a sequence of index numbers, to a random appearing group of PIN numbers, using a symmetrical secret key blocked encryption method. Incorporated into the encryption method is a control variable that specifies the word size of the blocked data for encryption or decryption. The word size control defines the maximum possible number of PIN codes that can be generated. By example a 32-bit word size represents 4,294,967,296 possible PIN codes, of which some or all may be used as PINs.

Various embodiments of the present invention improve upon existing or developing technologies such as non-currency based programs, loyalty systems, electronic lines of credit, online banking, gaming, and promotional campaigns.

BRIEF DESCRIPTION OF THE DRAWINGS

FIG. 21 shows the Polynomial Representation of a Base 27 number. Also included in this figure is an example of converting a Base 27 number to a Base 10 (decimal) number;

FIG. 22 is an example on Converting from a Base 2 number to a Base 27 Number;

DETAILED DESCRIPTION OF THE EMBODIMENTS

Figure 1:
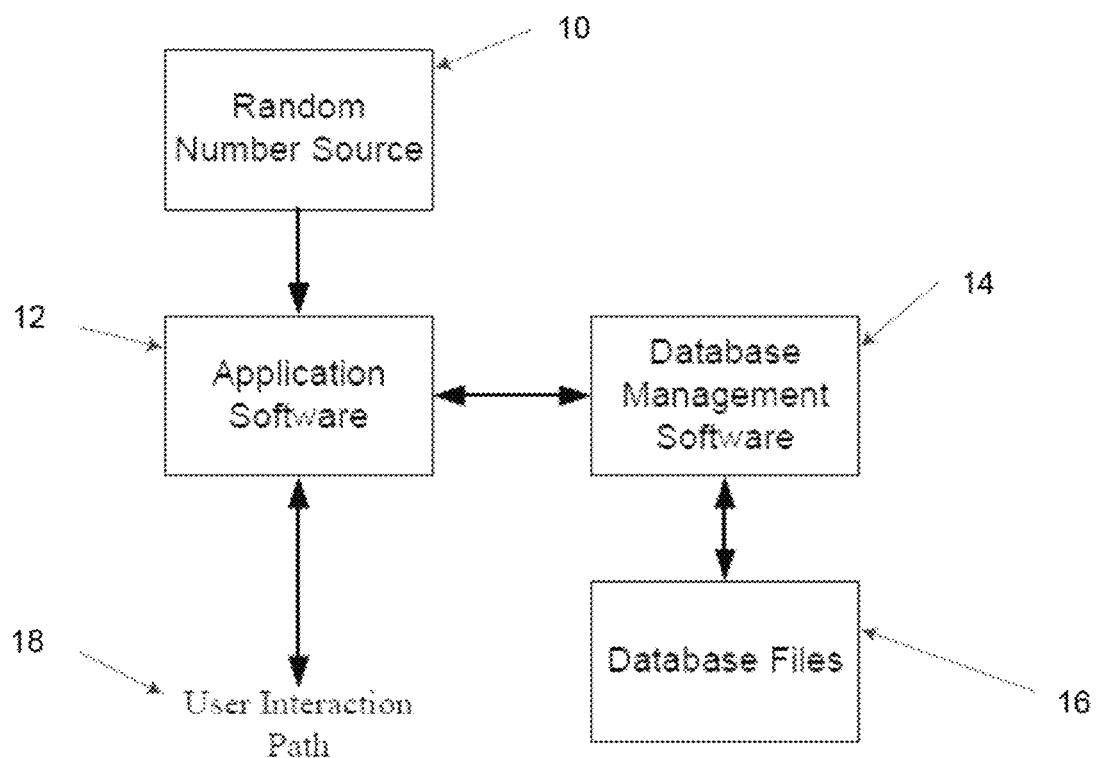
FIG. 1 is a block diagram depicting a prior art PIN generation method.

FIG. 1 is a simplified block diagram that represents a prior art PIN generation and management system that could be used for security, gaming, or promotion activities. The PINs are derived from a Random Number Source 10. The Random Number Source may be a table, pseudo-random algorithmic method, or a true random source such as a noise generator. The Application Software 12 places the PINs into a database 16 using Database Management Software 14. One of the limitations of this method is that the Application Software 12 must insure that there are no duplicate PIN numbers generated and stored into the Database Files 16. Along with the PIN values, the Database Files 16 may contain user and activity control information. Access to the PIN information will be dependent on the intended application. The User interaction path 18 facilitates user access to the PIN information. The User Interaction path 18 is typically application dependent. It may be a wired or wireless connection such a point to point terminal, a Local Area Network (LAN), or Internet Based. The User Interaction Path 18 may support a message encryption method to secure the transaction data.

Figure 2:
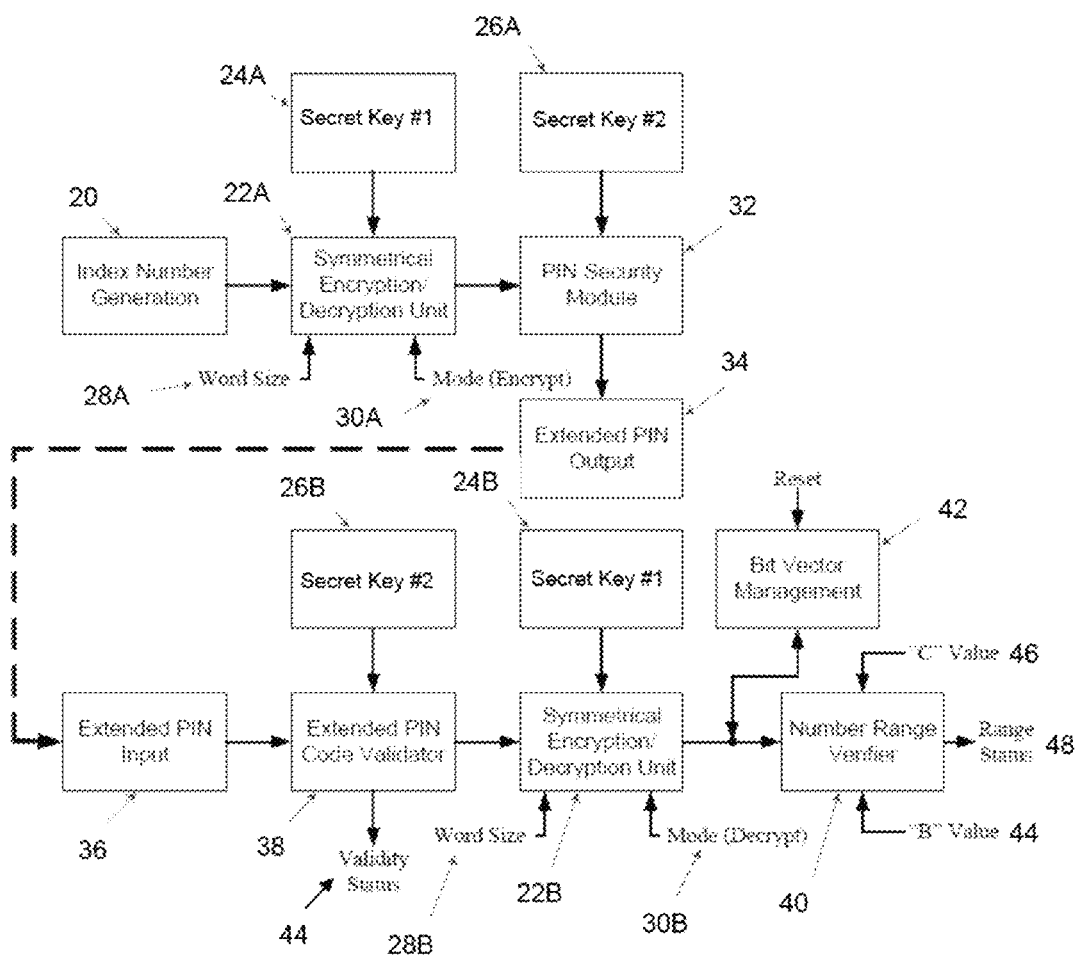
FIG. 2 is a block diagram of the personal identification number generation and validation system.

FIG. 2 illustrates a Personal Identification Number generation and validation system according to one embodiment. It should be understood that any flowcharts contained herein are illustrative only and that other program entry and exit points, time out functions, error checking routines and the like (not shown) would normally be implemented in typical system software. It is also understood that system software may run continuously after being launched. Accordingly, any beginning and ending blocks are intended to indicate logical beginning and ending points of a portion of code that can be integrated into a main program and called as needed. The order of execution of any of the blocks may also be varied without departing from the scope of this disclosure. Implementation of these aspects is readily apparent and well within the grasp of those skilled in the art based on the disclosure herein.

The PIN generation process includes the following: an Index Number Generator 20 is connected to a Symmetrical Encryption/Decryption Unit 22A. Secret key #1 24A selects the index number PIN ordered pairs generated by the Symmetrical Encryption/Decryption unit 22A. The term "Symmetrical" as used herein refers to a 1:1 correspondence between a given input and the resulting encrypted output. This allows for decryption of the encrypted data without data loss. Also acting as control elements to the Encryption/Decryption Unit are the Word Size Control 28A and Mode inputs 30A. The Word Size Control input 28A defines the number of bits used as a digital word for both the input and output ports of the Symmetrical Encryption/Decryption Unit 22A. The binary Mode Control input 30A defines the operational state as being either in an encryption or decryption mode. The input of the PIN security Module 32 is connected to the output of the Symmetrical Encryption/Decryption Unit 22A. Secret key #2 26A controls the generation of a security code that is concatenated with the input of the PIN Security Module and placed into the Extended PIN output Buffer 34.

The PIN validation process starts with the contents of Extended PIN Output buffer 34 being placed into the Extended PIN input buffer 36. The Extended PIN Output buffer 34 may be coupled to the Extended PIN input buffer 36 by any means including a wired or wireless communications path, disk file, or human keyboard input etc. The contents of the Extended PIN input buffer 36 acts as an input to the Extended Code Validator 38. The Validity Status 44 indicates if the Extended PIN Input Buffer 36 contents were produced by a PIN generator where the secret key #2 26A matches that of secret key #2 8B. If the Validity Status 44 is affirmative, a process sequencer (not shown) may proceed to convert the Extended PIN to a number index value by way of the Symmetrical/Encryption/Decryption Unit 22B. The operation of the Symmetrical Encryption/Decryption Unit 22B is identical to that of 22A except that the mode is set to decryption. If the Validity Status is negative indicating the extended PIN was not generated by an authorized PIN Generator as disclosed herein or not utilizing the same secret key #2 26A the process sequencer (not shown) may abort any further processing and take appropriate actions to indicate the invalidity of the processed Extended PIN input buffer 36 contents.

The output of the Symmetrical Encryption/Decryption Unit 22B is connected to both the input of the Number Range Verifier 40 and the Bit Vector Management process 42. The process sequencer may optionally use the index value output from the Symmetrical Encryption/Decryption Unit 22B to verify if a bit is set in a Bit Vector (not shown) located within the Bit Vector Management process 42. If the process sequencer determines the bit is set, it may indicate that the PIN code in Extended PIN input buffer had been processed at a previous time and should abort any further processing of the Extended PIN as well as take appropriate actions to invalidate the Extended PIN input. The Number Range Verifier 40 determines if the input of the Number Range Verifier is greater than or equal to the "B" input 44 to the Number Range Verifier 40 and less than or equal to the "C" value 46 of the Number Range Verifier 40. The Range Status output 48 of the Number Range Verifier 40 provides a binary status if the input is between values "B" and "C". The Bit Vector management process 42 sets a bit within a Bit Vector (not shown) as specified by the index value output from the Symmetrical Encryption/Decryption Unit 22B. Setting the bit within the bit vector indicates that the Extended PIN was valid and has been processed.

Symmetric, secret key, block encryption/decryption methods (symmetric-key) are defined as a class of algorithms for cryptography that use identical cryptographic keys for both encryption of plaintext and decryption of ciphertext. The keys, in practice, represent a shared secret. Other terms for symmetric-key encryption are secret-key, single-key, shared-key, one-key, and private-key encryption. Symmetric-key cryptography transforms (scrambles) a message into something resembling random noise. The key determines the precise transformation. Mathematically, a cryptographic algorithm is a function that maps a message onto a ciphertext (an encrypted message). By using keys, it is possible to encrypt many different messages using one particular cryptographic algorithm with a different outcome for each key. Some cryptographic algorithms that operate on fixed word lengths are referred to as block ciphers. Block (word) sizes of 32, 64, and 256 bits are commonly used. Some examples of popular and well-respected symmetric encryption/decryption algorithms are Twofish, Serpent, AES (Rijndael), Blowfish, CASTS, RC4, DES, Triple-DES, and IDEA.

Figure 3:
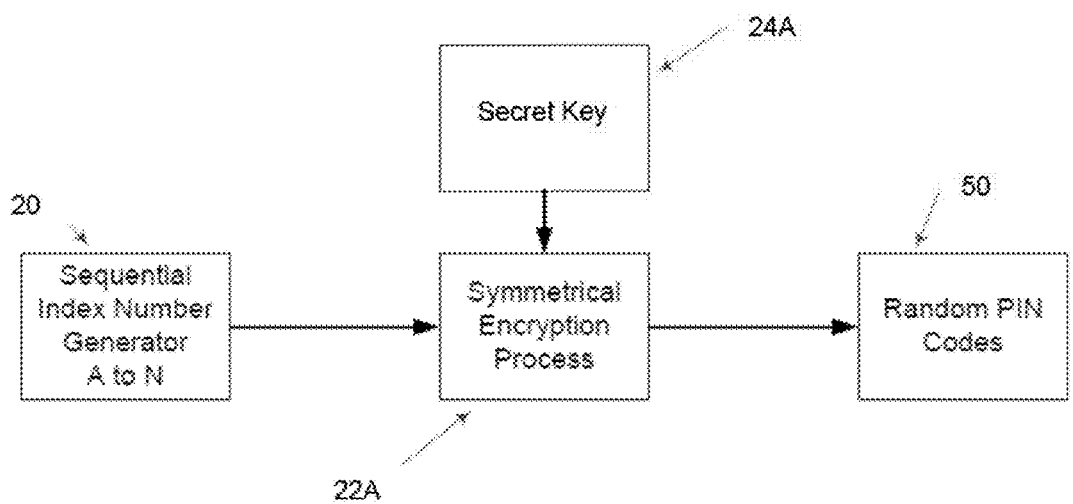
FIG. 3 is a block diagram of the index number to random PIN Pair Generation process.

FIG. 3 illustrates the process of converting an index number to a PIN code. Sequential Index Number Generator 20 generates contiguous numbers from the values A to N. In one example A may be 10 and N may be 10,000. The Symmetrical Encryption Process 22A "transforms" the index numbers into a new set of output numbers "de-correlated or randomized" from the index input values. The output numbers are the PIN numbers. Each PIN number as found in Random PIN codes 50 will be uniquely paired with the input index numbers as generated by the Sequential Index Number Generator 20. The secret key 24A defines the one-to-one relationship between the index numbers and the PIN codes. Changing the contents of secret key 24A changes the pairing between the index numbers and the PIN codes. The word size (number of bits) of the index values and the PIN codes are identical. The word size defines the number of index number/PIN code pairs that are possible.

Figure 4:
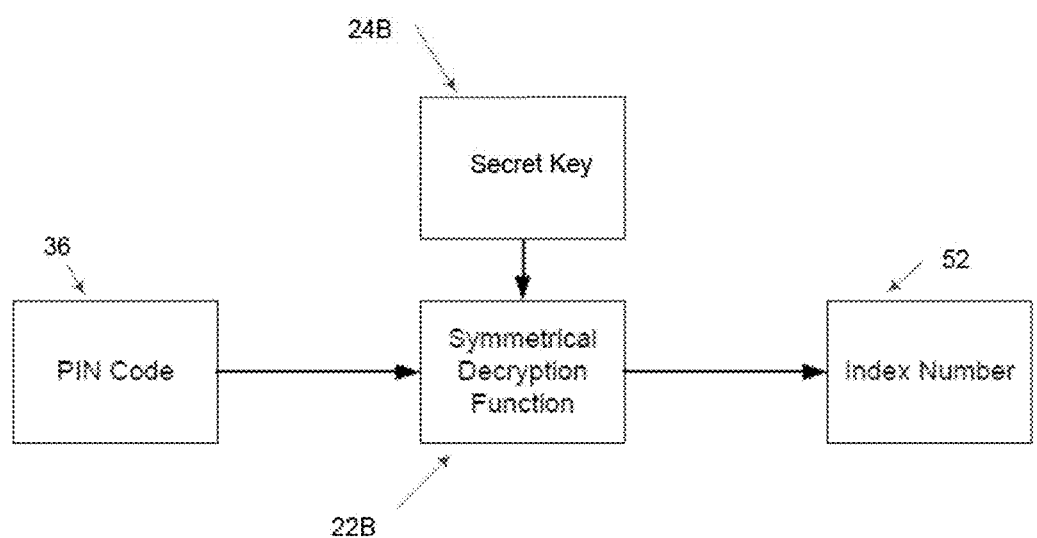
FIG. 4 is a block diagram showing PIN code to index Number reverse pairing.

FIG. 4 demonstrates the process of reversing the PIN codes to the original index numbers used to create them. The PIN code 36 is decrypted using the Symmetrical Decryption Function 22B to produce an Index Number 52. The same secret key, e.g., 24A, must be used in 24B to successfully perform the translation from PIN code 36 to Index Value 52.

Figure 5:
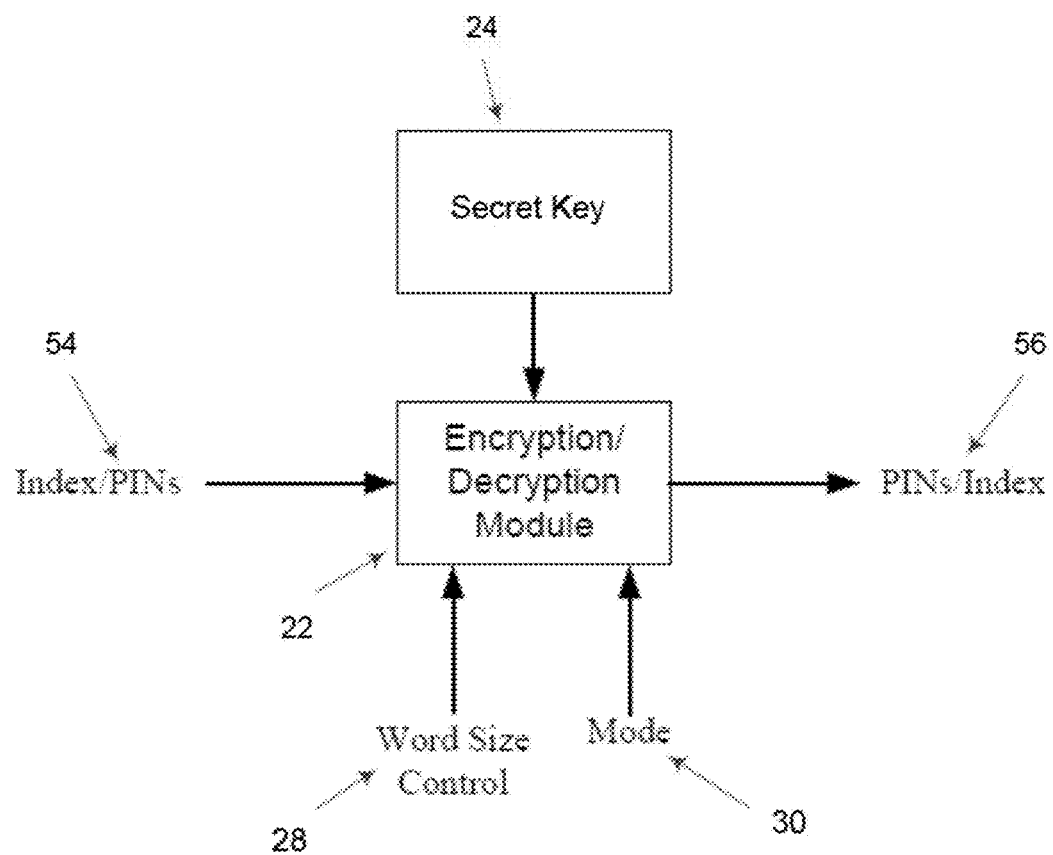
FIG. 5 is a block diagram showing a symmetrical encryption/decryption unit.

FIG. 5 shows a Symmetrical Encryption/Decryption Module 22. Its operation is defined by the binary mode control 30 and places the module 22 in either an encryption mode or a decryption mode, e.g., 22A or 22B as shown in FIG. 2. The Mode control 30 defines the context of the input data index/PINS 54 or the output data PINs/Index 56. Word Size control 28 specifies the number of bits for input 54 or output 56. Input 54 and output 56 will always be the same word width.

Figure 6:
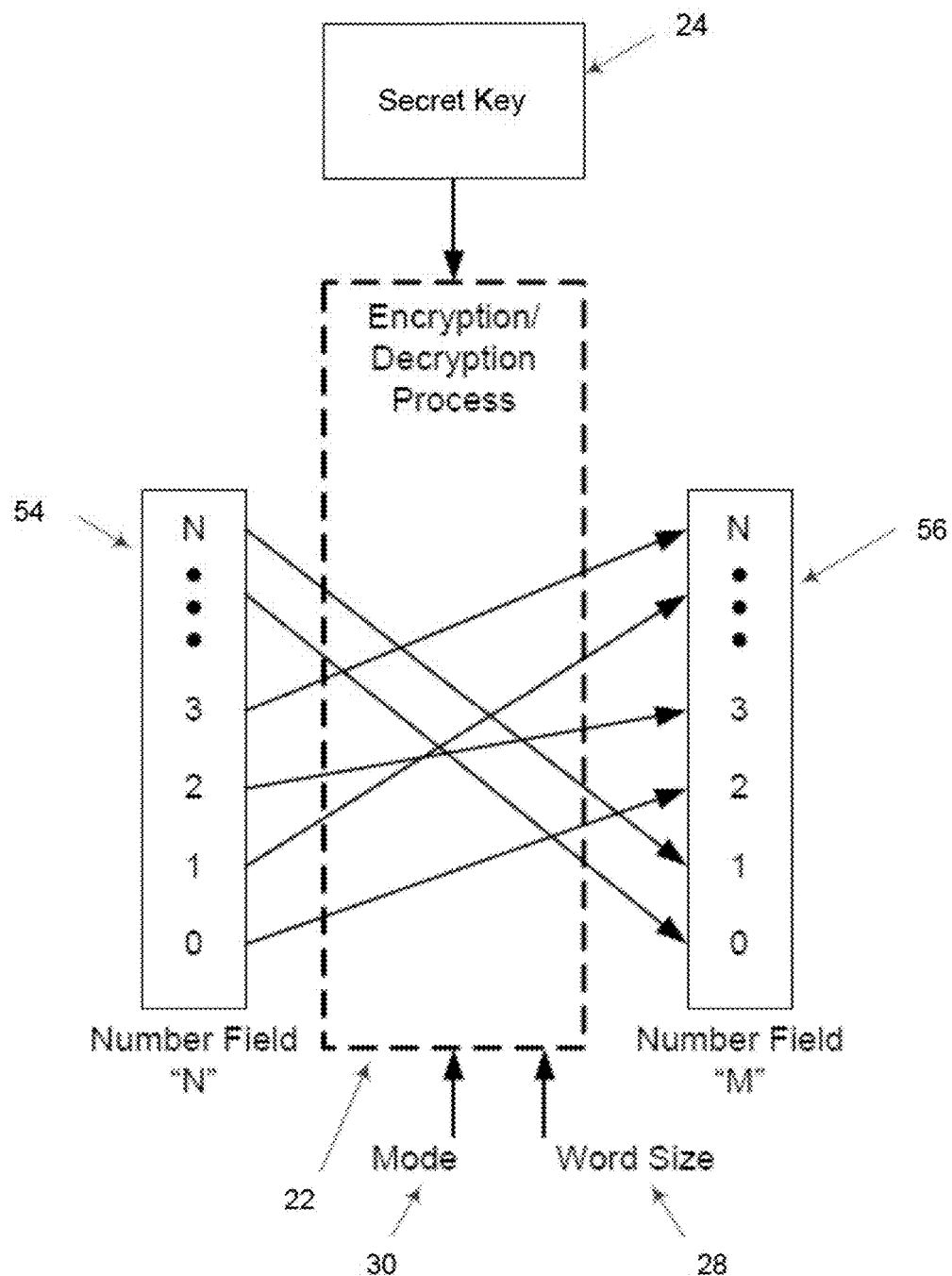
FIG. 6 is a simplified block diagram showing the encrypting/decrypting process as a one to one mapping.

FIG. 6 depicts the concept of the Encryption/Decryption process 22 as a "mapping" function defined by the contents of secret key 24. Number field "N" 54 is a contiguous ascending group of numbers ending at "N". Number field "M" 56 is also a contiguous ascending group of numbers ending at "N". Secret key 24 defines the mapping relationship that "scrambles" or de-correlates the input numbers (Field "N" 54) to the output numbers (Field "M" 56).

It is possible to implement the Encryption/Decryption process as a look-up table, whereby the input data may be an index to a "scrambled" content table. Every possible value for input 18, exists somewhere in the table contents. The exact location is a function of the "scramble" function that defines the table contents. The Encryption/Decryption solution as a table may become impractical to implement as the Word Size 20 and secret key 7 size values increase. In such embodiments, there are two tables for each secret key, one for encryption and another for decryption. Table selection is controlled by the input Mode 30. The total size allocated for table space is: Total number of table bits=(2wordsize)×(2keysize)×(wordsize)×(2). In another embodiment a "one time" cipher pad solution (not shown) may be used to implement the encryption and decryption processes. When the size of the one-time pad becomes infeasible to implement, an algorithmic method may be used, e.g., DES or Blowfish.

Figure 7:
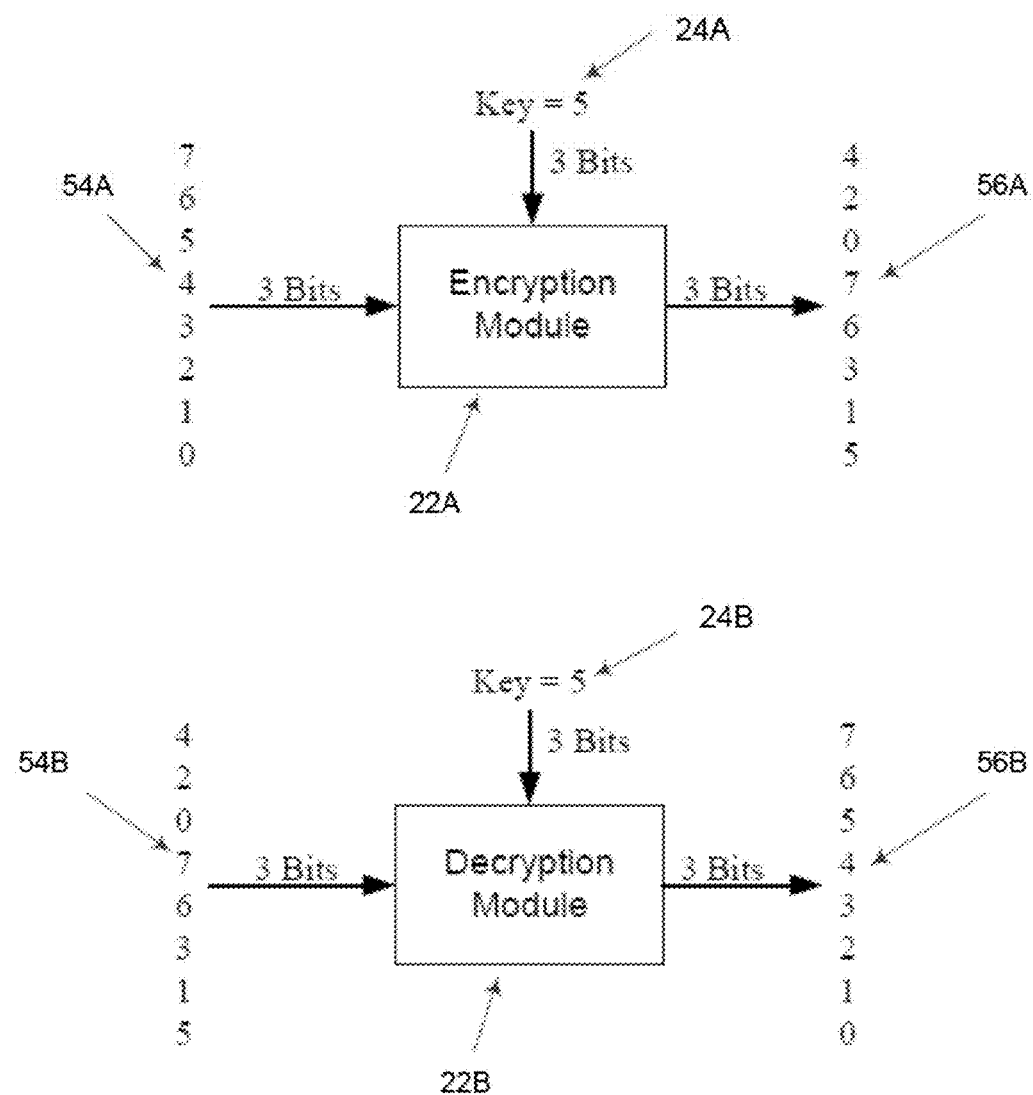
FIG. 7 is a simplified example of the symmetric encryption and decryption process.

FIG. 7 further illustrates the concept of the secret key 24A, 24B controls the Encryption 22A and Decryption 22B processes. In this example, encryption module 22A has as input a 3 bit ascending number set 54A. A scrambled number set 56A is output from Encryption Module 22A. It should be understood that every number in 54A is found in 56A but scrambled. The scrambling is defined by the key input. For this simplified encryption example the word size is 3 bits, and the key size is 3 bits. To decrypt 56A the values are transferred as 54B and become input to decryption module 22B using the same key value 24B the output becomes 56B which is identical to the original 3 bit number set 54A.

Figure 8:
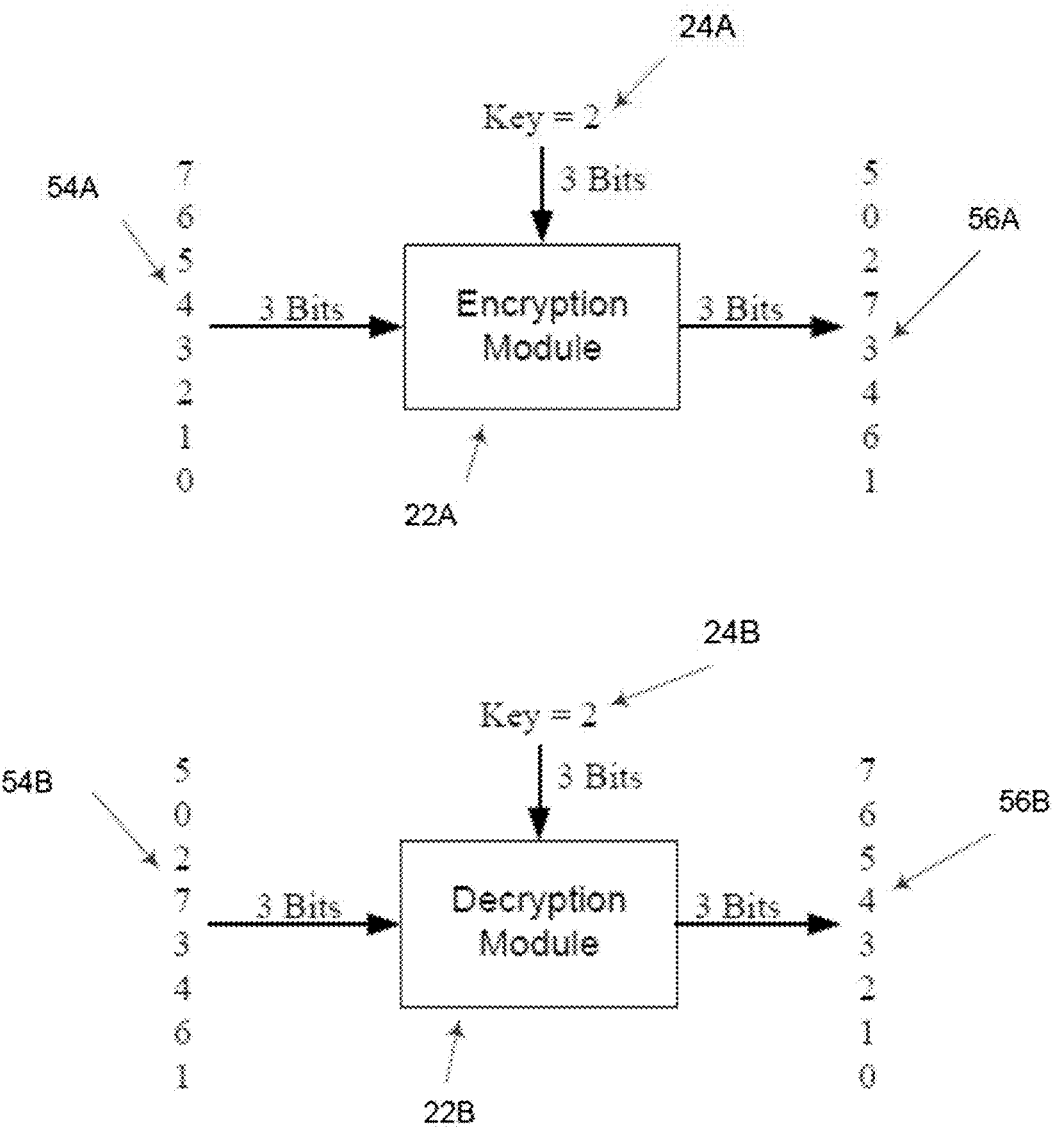
FIG. 8 is a second example of the symmetric encryption and decryption process.

FIG. 8 is another example, similar to the example shown in FIG. 7 with the exception the Key 7A value has been changed. The result is the scramble sequence 56A has been re-mapped to a new sequence.

Figure 9:
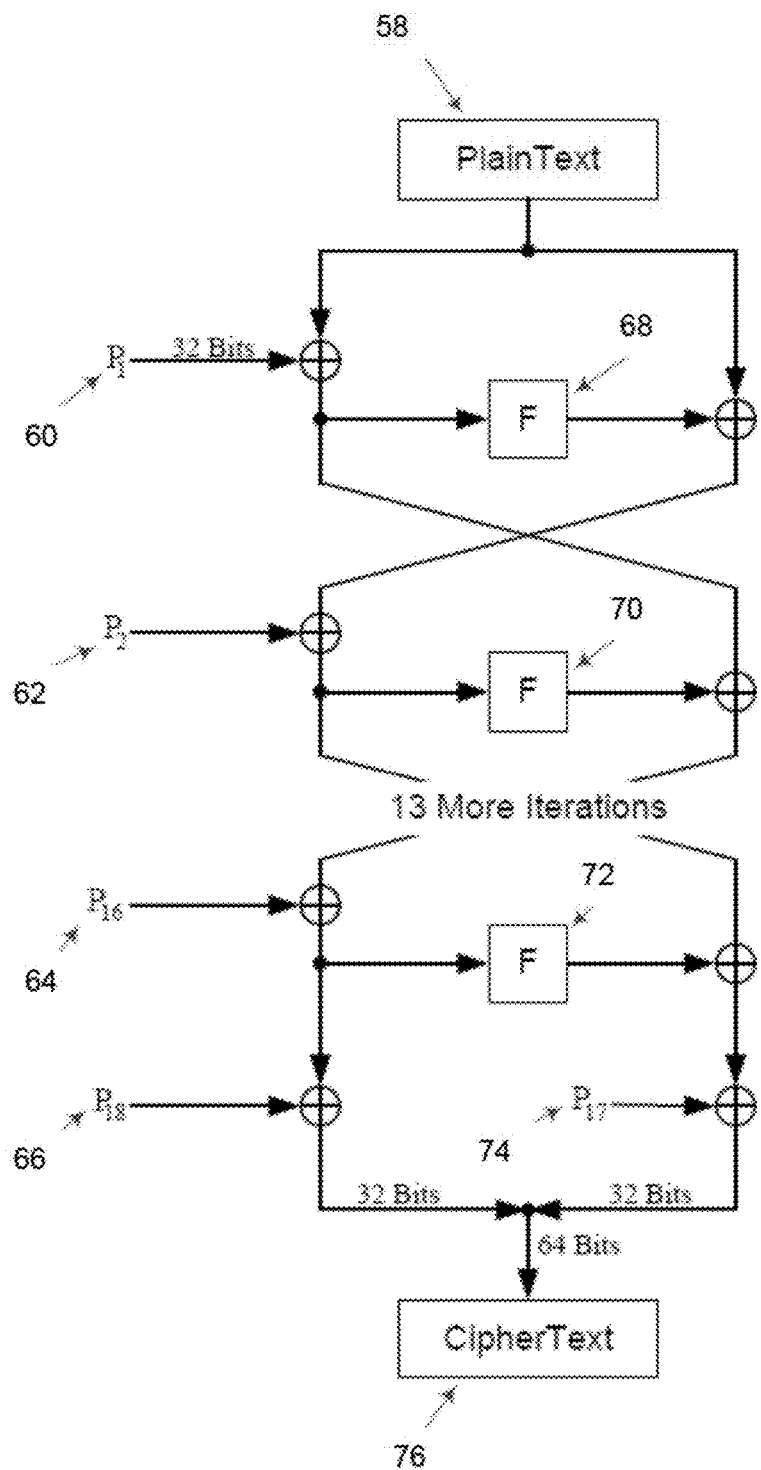
FIG. 9 is a process flow chart for the Blowfish Encryption algorithm.

The Blowfish encryption algorithm is an excellent example of a symmetric, secret key, block encryption/decryption method suitable for PIN generation. Notable features of the design include key-dependent S-boxes and a highly complex key schedule. FIG. 9 is a flow chart indicating the process stages and elements to implement the Blowfish process. The Blowfish algorithm has an adaptable word size and uses a 64-bit block size and a variable key length from 1 bit up to 448 bits. It is based on a 16-round Feistel symmetric cipher and uses large key-dependent S-boxes to implement the algorithm. A preferred embodiment of this invention allows for the adjusting of both the size and the contents of the S-boxes as well as the input and output word size.

FIG. 9 shows a Blowfish process in detail. Each line represents 32 bits. The algorithm keeps two sub-key arrays: the 18-entry P-array 60, 62, 64, 66, 74 and four 256-entry S-boxes 68, 70, 72. The Sboxes 68, 70, 72 accept 8-bit input and produce a 32-bit output. One entry of the P-array is used every round, and after the final round, each half of the data block is XORed (a logical binary function) with one of the two remaining unused P-entries. The function splits the 32-bit input into four eight-bit quarters, and uses the quarters as input to the S-boxes 68, 70, 72. The outputs are added modulo $2^{32}$ and XORed to produce the final 32-bit Cipher-Text output 76.

Decryption is exactly the same as encryption, except that P1 thru P18 are used in the reverse order. Blowfish's key schedule starts by initializing the P-array and S-boxes with values derived from the hexadecimal digits of pi (rr), which contain no obvious pattern. The secret key is then, byte by byte, cycling the key if necessary, XORed with all the P-entries in order. A 64-bit all-zero block is then encrypted with the algorithm as it stands. The resultant ciphertext replaces P1 and P2. The same ciphertext is then encrypted again with the new subkeys, and P3 and P4 are replaced by the new ciphertext. This continues, replacing the entire P-array and all the S-box entries. In this example, the Blowfish encryption algorithm will run 521 times to generate all the subkeys and about 4 KB of data is processed. As noted previously by modifying the S-box size and content the word size may be adjusted for PlainText 58 and Cipher Text 76.

Figure 10:
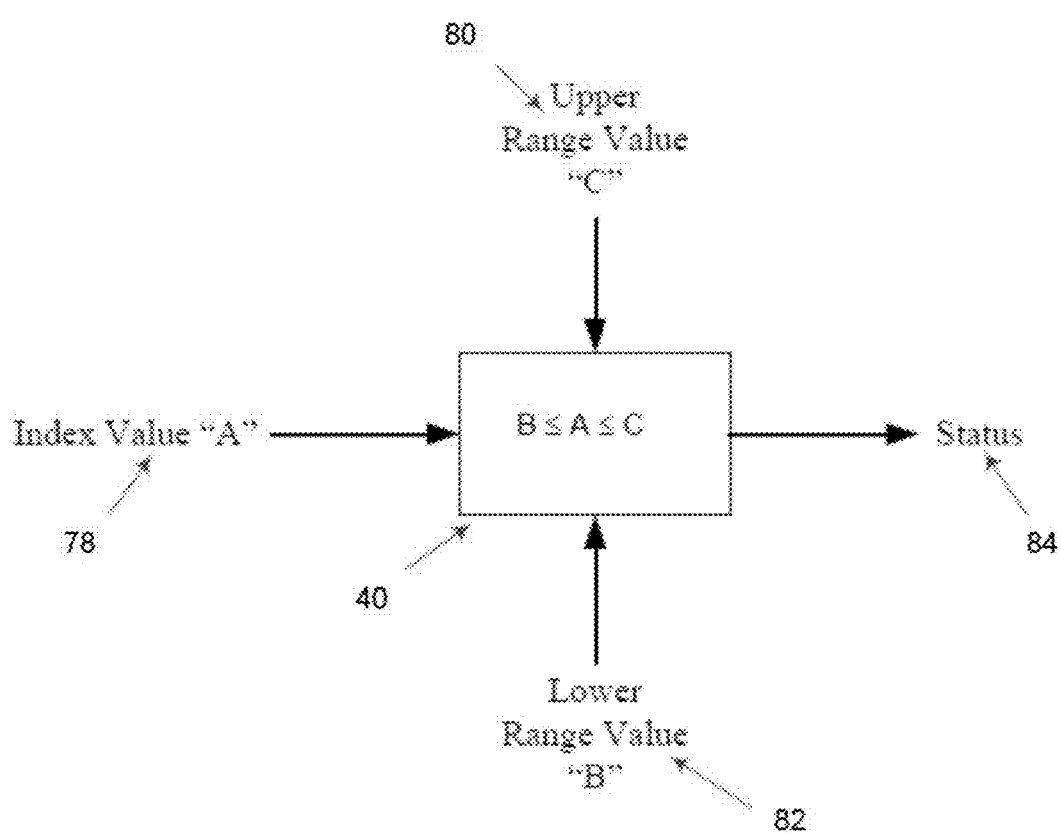
FIG. 10 shows the key elements of the Number Range Verifier in a block diagram. It also shows the mathematical relationship between the Index Value and the Upper and Lower Range values.

FIG. 10 is a block diagram exemplifying the process of index number range verification. The Index Value "A" 78 is used as input to the Number Range Verifier 40 which determines if the value of A is greater than or equal to input value "B" 82 and less than or equal to input value "C" 80. A binary status 35 will indicate if the relationship holds true. The purpose of the Number Range Verifier 40 is to determine if a PIN number when converted back to its original index value is within a specific range of index numbers. By example if A=20, B=17 and C=31 the Status 84 will be set to a true status, e.g., logical one. Conversely if A=5, B=17, and C=31 the Status 84 will be set to a false status, e.g., logical zero.

The embodiments disclosed above utilize the symmetric encryption/decryption method to map or translate between index number values and PIN numbers. This however is not intended to limit the scope of this disclosure. Other methods such as forward and reverse look-up tables may be used. Other methods of encryption/decryption such as Public Key Cryptography may also be used.

Figure 11:
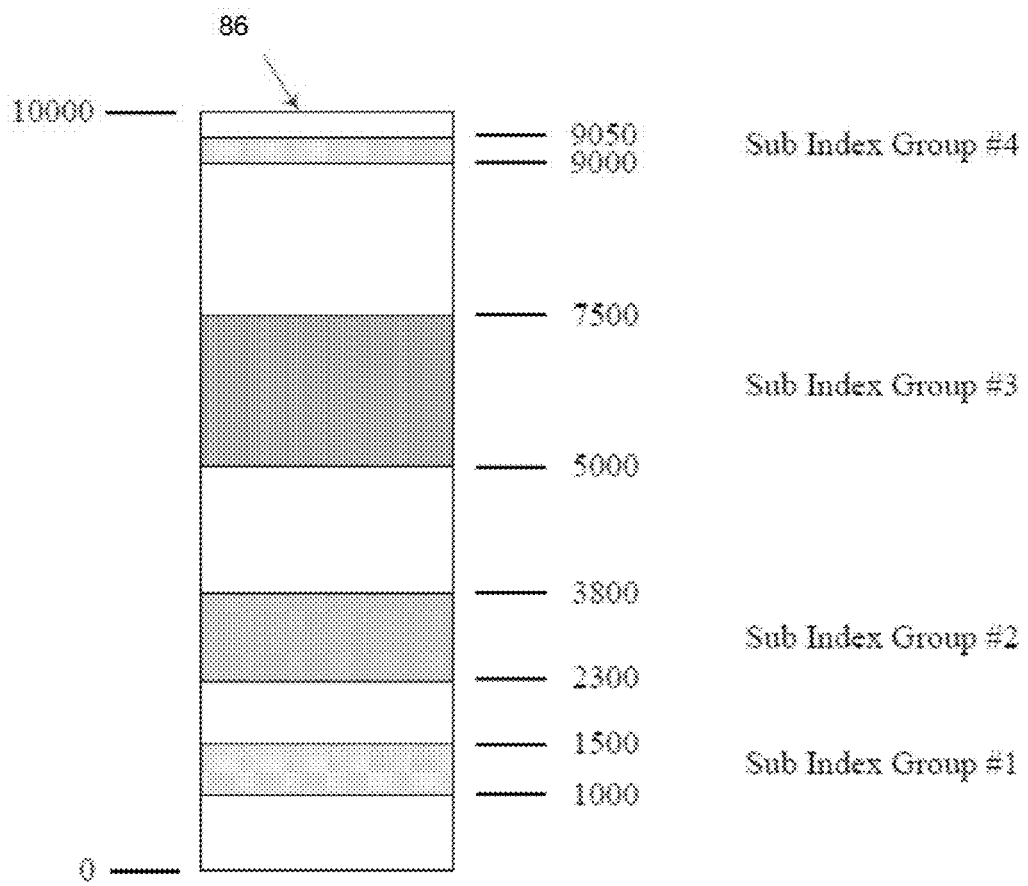
FIG. 11 is a pictorial example showing the entire Index Range and associated sub groups defined within the index range.

FIG. 11 provides further detail on the flexibility of index range verification. As can be seen in block 86, multiples grouping of sub index groups are shown. The beginning and end values for each sub group are used as value for B 82 and C 80 to determine if a single value of A 78 is contained in one of the multiple sub groups.

Figure 12:
FIG. 12 shows the index range of each sub group as defined in FIG. 11 in table format.

FIG. 12 expresses the sub grouping found in FIG. 11 in the form of a table 88. Each subgroup may have a unique context as a detection result. For example if used in a gaming application the sub groups may represent prize levels. For a security application the sub groups may represent levels of authority for entry. It is also possible to overlap sub groups (not shown) so that any particular index number may be interpreted to have multiple contexts.

Some applications using the index to PIN number method as disclosed herein may require the index values grouped whereby they are not organized as isolated subgroups or sequential lists. By example, the index numbers may be ordered in lists that are non-sequential, or the subgroups specified to overlap by some pre-defined factor.

Figure 13:
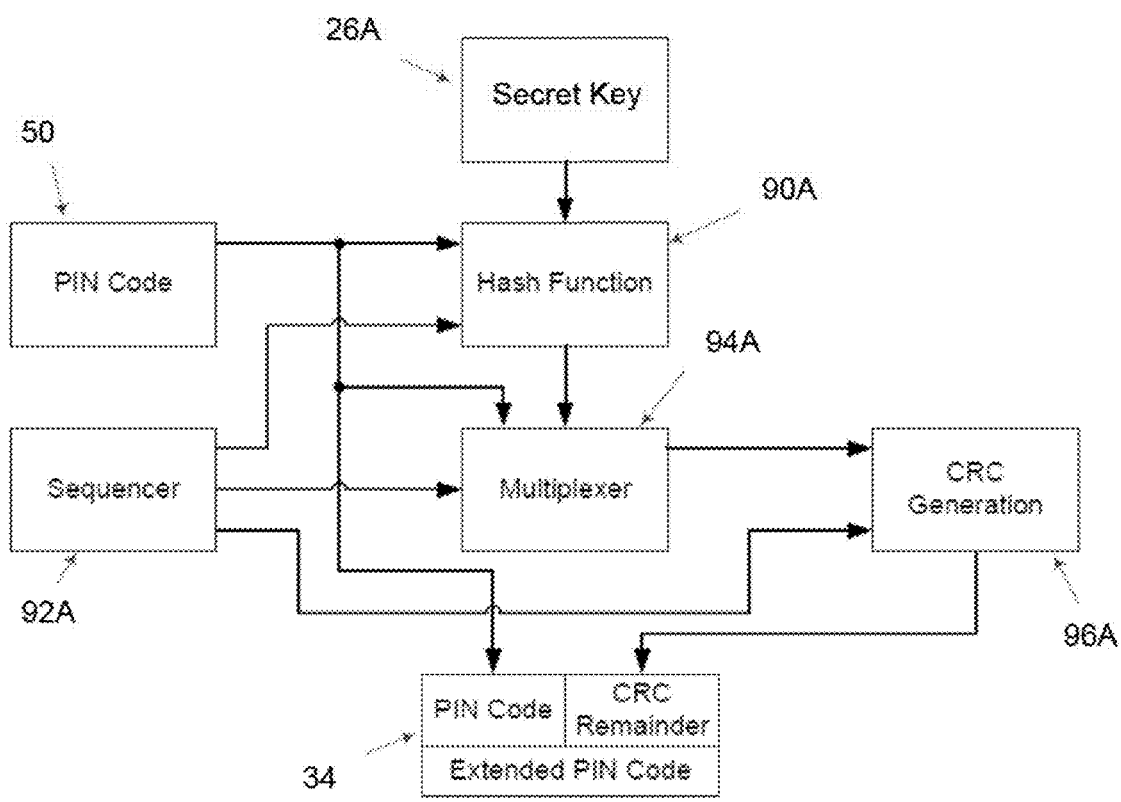
FIG. 13 depicts a block diagram showing the process flow for the PIN security module.

FIG. 13 is a block diagram of the PIN Security Module. Its purpose is to introduce a level of security that will permit the authentication of a PIN code. PIN Code 50 represents the output of the Symmetrical Encryption/Decryption Unit block 22A in FIG. 2. This output contains the result of the index number to PIN number generation process. The PIN Code 50 is used as input to Hash Function 90A and the Extended PIN Code buffer 34. Hash Function 90A uses secret key 26A (which is unique and different from secret key 24 used to encrypt and decrypt index number/Pin Code pairs) to generate a keyed hash signature. Multiplexer 94A sequences the inputs from the Hash Function 90A (keyed hash signature) and the input PIN Code 50 to the input of the CRC generation process 94A. The sequencing is under the control of Sequencer 92A. The CRC Generation process 94A computes a CRC remainder. The Extended PIN code is then composed of the concatenated values of the PIN Code 50 and the CRC remainder as computed by the CRC Generation process 94A.

A one way hash function is a deterministic algorithm that takes an arbitrary block of data and returns a fixed-size bit string referred to as a "signature." The term "one way" means that it's nearly impossible to derive the original text from the string. The ideal one-way hash function has four main or significant properties. It is easy (but not necessarily quick) to compute the hash value for any given block of data. It is infeasible to recreate a block of data from its given hash. It is infeasible to modify a block of data without changing the hash signature. It is infeasible to find different blocks of data with the same hash signature result.

Adding a secret key to the hashing process can further enhance the hash function. Changing the key will change the signature on any given fixed size block message. By virtue of the hash function being "one way" and adding the complexity of a secret key to the hash algorithm it becomes nearly impossible to compute the signature of a data block without knowing the secret key. An example of a keyed hash function is the NIST Digital Signature Algorithm (DSA) which uses Public/Secret key methods to control the hash outcome.

A cyclic redundancy check (CRC) is a mathematical process that can generate a checksum capable of detecting changes to a raw data block, and is commonly used in digital networks and storage devices for error control. CRCs are so called because a check remainder due to modulo 2 division by a fixed constant value represents a redundancy factor. Specification of a CRC code requires a definition of a generator polynomial. This polynomial acts as the divisor in long division using Galois finite field GF(2) arithmetic. The "message" bit stream (message block serialized) is the dividend. In performing a CRC division, the quotient is discarded and the remainder becomes the final result. The length of the remainder is always less than the length of the generator polynomial. A well-known and commonly used CRC polynomial is the CRC-32:

$$x^{32}+x^{28}+x^{27}+x^{26}+x^{25}+x^{23}+x^{22}+x^{20}+x^{19}+x^{18}+x^{14}+x^{13}+x^{11}+x^{10}+x^{9}+x^{8}+x^{6}+1$$

By substituting 2 for x, the CRC-32 becomes a fixed constant.

Figure 14:
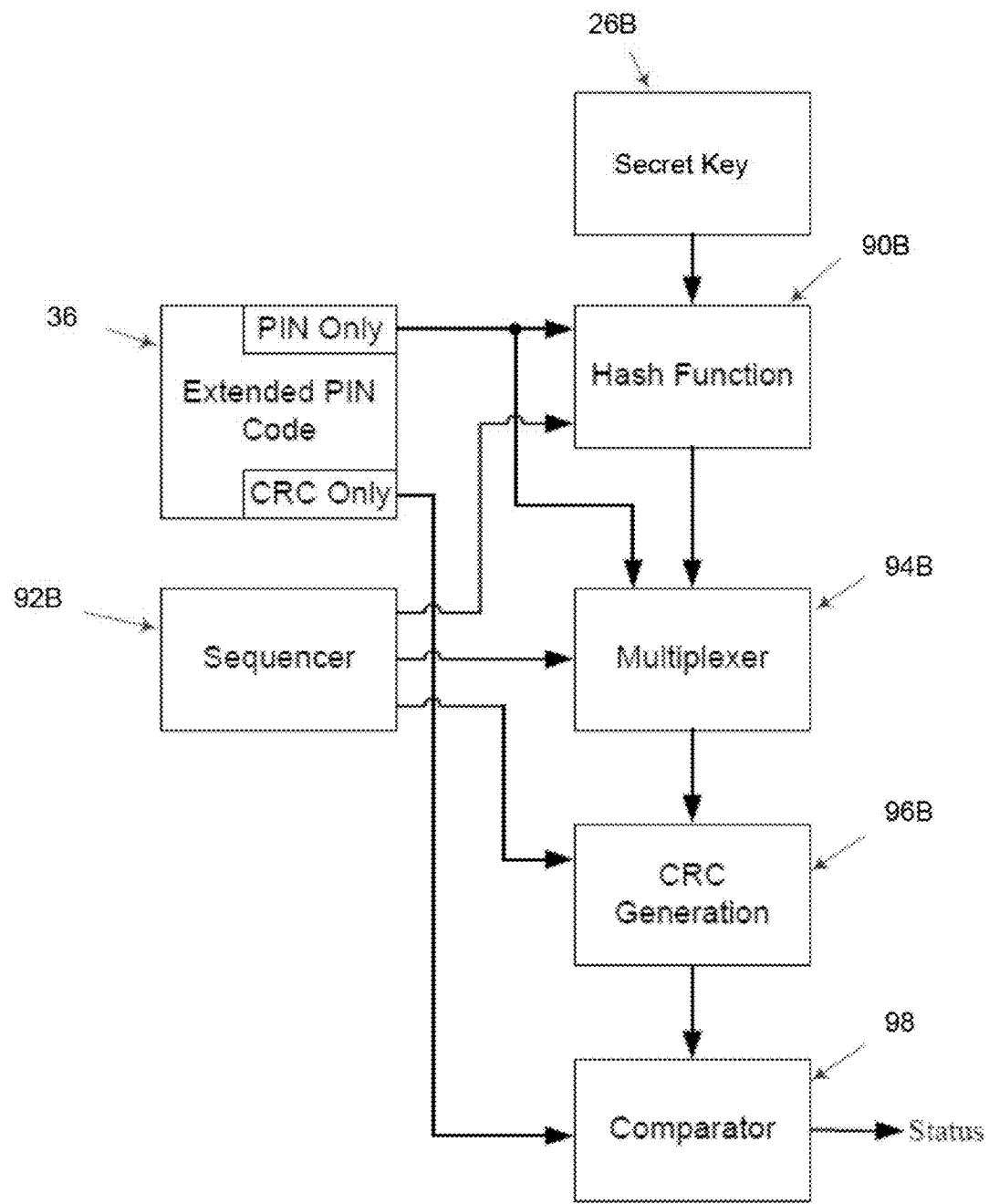
FIG. 14 is a block diagram that shows the process flow for the procedure of validating the Extended PIN Code.

FIG. 14 is a block diagram of the Extended PIN Code Validator process. The PIN Code Validator will recreate the keyed hash signature as originally generated by block 90A in FIG. 13. Using the PIN only portion of the Extended PIN code 36 and the recreated hash signature, a CRC remainder will be calculated by block 96B the CRC Generation process. The CRC remainder will then be compared to that found as a component of the input Extended PIN code 36. The match status from Comparator 98 will indicate if the CRC remainder from recreated matches that of the Extended PIN code 36. To perform this function, the extended PIN Code 36 is compared to that which was generated in block 34 in FIG. 13. The PIN only portion of block 36 is used as input to the keyed Hash Function 90B. The key for block 90B is 26B and the content must be identical to that of 26A in FIG. 13.

The output of the Hash Function 90B along with the PIN Only element of Extended PIN Code 36 are used as input values to Multiplexer 94B. Under the control of sequencer 92B the CRC generation process will input values from the Multiplexer 94B. The output of the CRC Generation block 96B is compared to that of the CRC value contained in Block 36 of the Extended Pin Code by Comparator 98. If both CRC remainders match, the binary status of Comparator 98 will be set to a logical one. If they do not match the status will be set to zero.

A Bit Vector may represent an efficient way to track the status of a PIN code. When a PIN code is converted to an index value, the index value is used as a target address. The Bit Vector is initially cleared to all zero bit values. When a valid PIN is processed the associated bit within a Bit Vector may be set to 1. If the PIN number repeats due to multiple use the status of the PIN can be extracted from the Bit Vector to check for prior use.

A Bit Vector is an array of data bits. A typical bit vector stores kw bits, where w is the number of bits in the unit of storage, such as a byte or word, and k is some nonnegative integer. Although most computers are not able to address individual bits in memory, nor have instructions to manipulate single bits, each bit in a byte can be singled out and manipulated using bit-wise operations. In particular:

OR can be used to set a bit to one: 11101010 OR 00000100=11101110

AND can be used to set a bit to zero: 11101010 AND 11111101=11101000

Bit arrays, despite their simplicity, have a number of marked advantages over other data structures for the same problems. They are extremely compact; few other data structures can store n independent pieces of data in n/w bytes. They allow small arrays of bits to be stored and manipulated in the register set for long periods of time with no memory accesses. Because of their ability to exploit bit-level parallelism, limit memory access, and maximally use the data cache, they often outperform many other data structures on practical data sets, even those that are more asymptotically efficient. Each data bit stored in a bit vector has a "position" or Index Number. In this example, the bit position is calculated by multiplying its Byte Position by 8 and adding in the Bit Location. For example, the 5th bit in the 8th byte would have a position or index number of 69.

Figure 15:
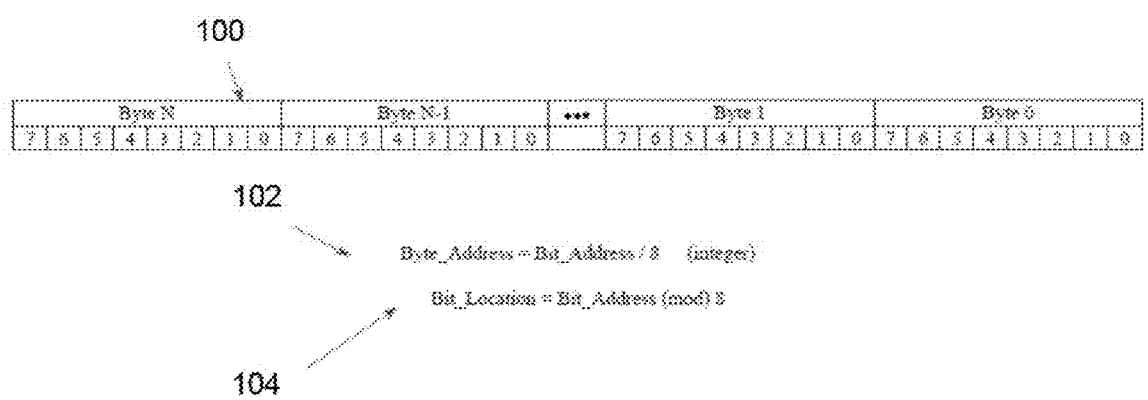
FIG. 15 shows the format of a Bit Vector implemented as Concatenated Bytes. The figure also shows the mathematical formulas for calculating the Byte Address and Bit Location within the Bit Vector.

FIG. 15 provides an example of the general structure of a Bit Vector 100. Equation 102 shows how to calculate a byte address within the Bit Vector, and equation 104 expresses how to calculate the bit position once the byte value is isolated.

Figure 16:
FIG. 16 is a table containing the hexadecimal and decimal values for the bit mask that would be utilized in the bit read and bit write functions for the bit vector.

FIG. 16 exemplifies a Bit Mask Table 106 that may be used to isolate a bit within a byte (8 bit word). A value for the bit position is used as an index to look up a bit mask. The bit mask is then logically ANDed with a byte value to isolate the individual bit. A bit mask is also used to isolate the value of a bit within a Bit Vector. When targeting a specific bit within a Bit Vector, the bit target address is divided by the factor 8 as an integer function (no remainder). This intermediate value is then used as a byte address to extract a single byte from the Bit Vector. Once the single byte is extracted, a bit position is computed by applying a modulus (8) function to the original bit target address. The Bit isolation method using the Bit Mask Table 106 can then be applied.

Figure 17:
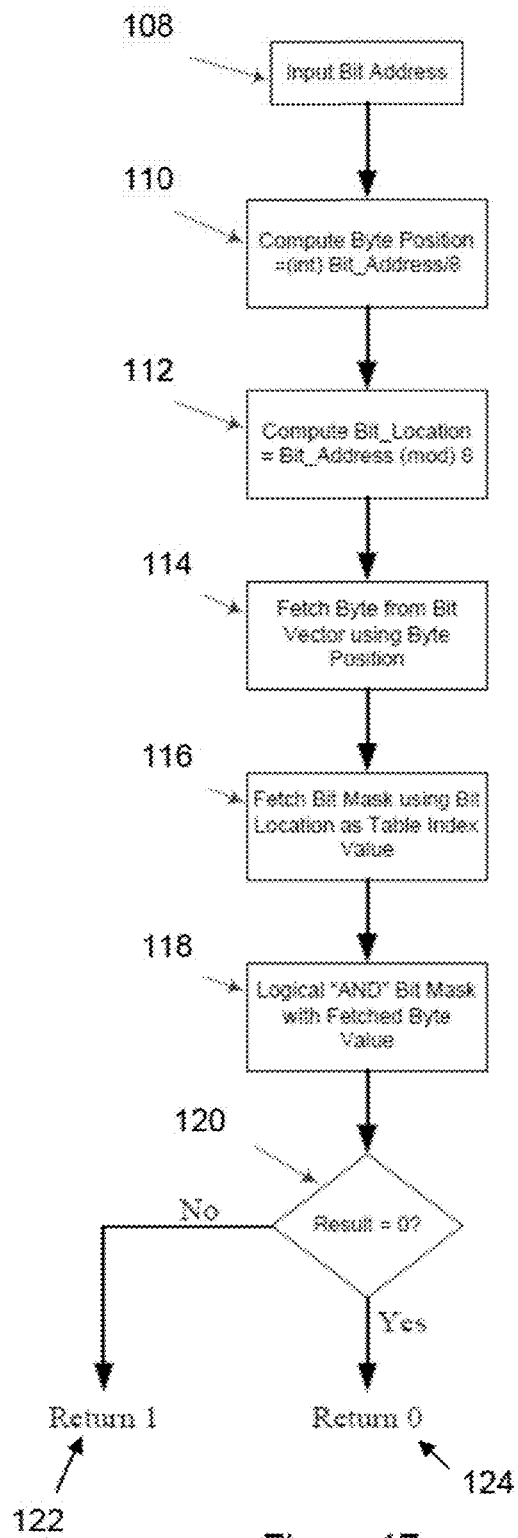
FIG. 17 is a process flow chart that depicts the steps involved for performing the Bit Read Function on the Bit Vector.

FIG. 17 exemplifies the process of a Bit Vector read function in the form of a flow chart. Input Bit Address (input index value) 108 is used as input to the Compute Byte Position block 110 by using the formula: (int)(Bit_Address/8). The output of block 110 is used by block 112 to Compute the Bit Location by using the formula: Bit_Address (mod) 8. Block 114 will fetch a Byte from the Bit Vector using the Byte Position calculated in block 110. Block 116 Fetches the Bit Mask from the Bit Mask Table using the Bit Location calculated in 112 as the Table Index value. Block 118 will Logically "AND" the Bit Mask with the Byte Value fetched from the Bit Vector in block 116. Decision block 120 will check the result of block 118, if the result from block 118 is a zero, a return value of "0" 124 will be sent back to the calling function, if the result from block 118 otherwise return a "1" 122 to the calling function. The return values 122, 124 therefore indicate if the bit within the Bit Vector as targeted by the index value is set to a 1 or 0.

Figure 18:
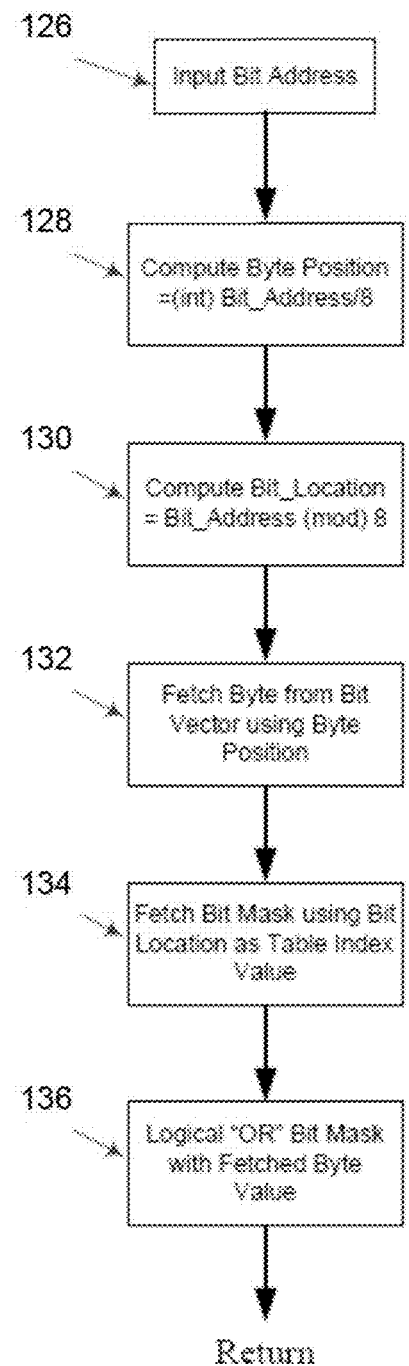
FIG. 18 is a process flow chart that shows the steps for performing the Bit Write Function on the Bit Vector.

FIG. 18 is the process of a Bit Vector write function depicted as a flow chart. A Bit Address is input into the block 126 (Input Bit Address). This address is used as the input to the Compute Byte_Position 128. The formula (int)(Bit_Address/8) is used to compute the Byte_Position. The output of block 57 is used as the input to block 130, Compute Bit_Location, by using the formula Bit_Address (mod) 8. Block 132 will fetch a Byte from the Bit Vector using the Byte Position calculated in block 128. Block 134 will fetch the Bit Mask from the Bit Mask Table using the Bit Location computed in block 130 as the table's index value. Block 136 will logically "OR" the Bit Mask from block 134 with the Byte Value from block 132. Control will then be returned to the calling function.

Figure 19:
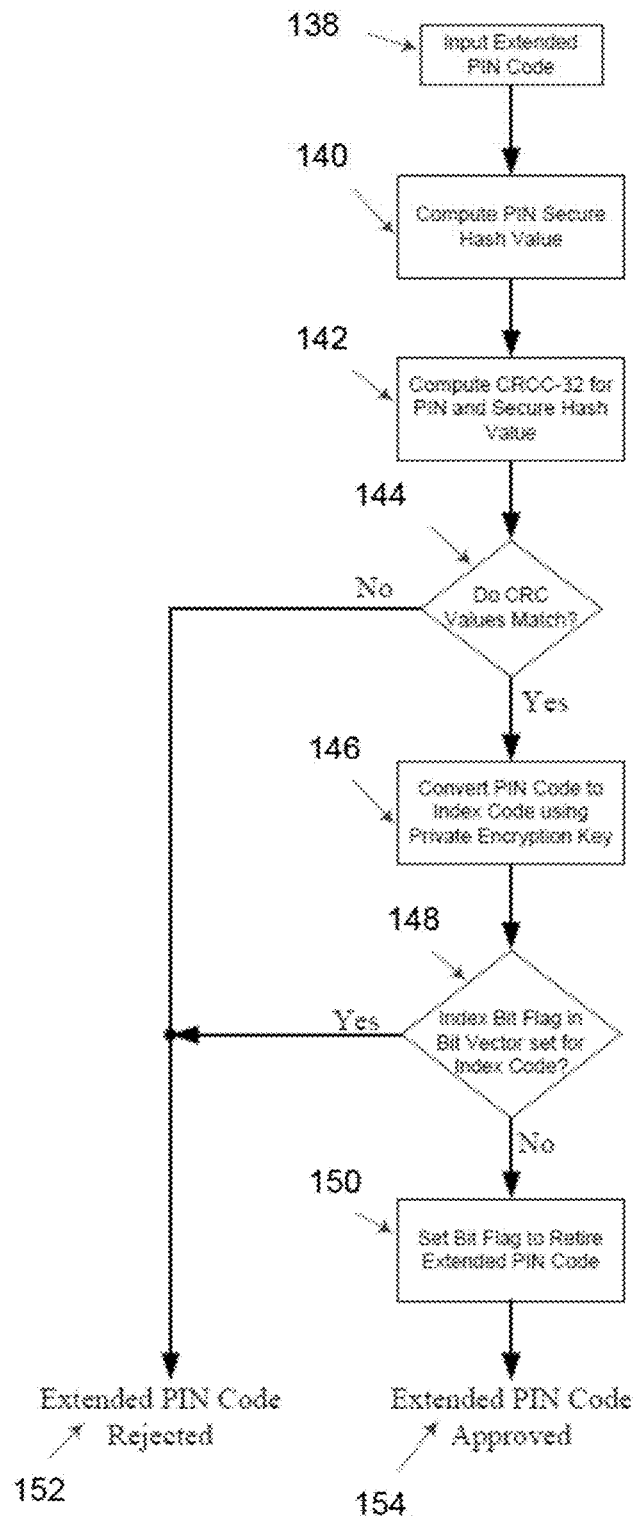
FIG. 19 is a process flow chart showing the process steps for performing the validation and retirement of an Extended PIN Code.

Although the above disclosure is directed to an implementation of a Bit Vector is to track PIN use, it is possible to use other methods such as a data base, a fielded file, or any data storage means that would permit the recording of a PIN status. FIG. 19 depicts a flow chart showing the process of validation and retirement of an Extended PIN Code. Block 138 receives as its input an Extended PIN Code to compute a Secure Hash Value as shown by block 140. The PIN and Secure Hash Value will be input to Block 142 to compute the CRCC-32 value for the PIN and Secure Hash Value. Decision Block 144 will compare the computed CRCC-32 with the CRCC-32 received as part of the Extended PIN Code. If the values do not match, no further processing is required and a Validity Status of "rejected" 152 is sent back to the calling function. If the CRCC-32 values do match, the PIN code is input into block 146 for conversion to the index code using the secret key. Decision block 148 will check, via the Bit Vector Bit Read function, if the bit corresponding to the Index Code computed in Block 146 is set in the Bit Vector. If the bit is already set, no further processing is required and a Validity Status of "rejected" 152 is sent back to the calling function. If the bit is not set, block 148 will, via the Bit Vector Write Bit Function 150, set the bit corresponding to the Index Code calculated in block 146. The validity status is set to "approved" 154 and control is returned to the calling function.

Figure 20:
FIG. 20 is the Specification Table for the Base 27 number system utilized in the invention. The table shows the decimal values and their associated Base 27 character.

A PIN code or an Extended PIN code as disclosed herein, may have many binary digits such as 48 or 64 bits. Even when expressed as a decimal number the digit count can be lengthily. As such, it is desirable to express the PIN code in a more efficient number base system. FIG. 20 is an example of using a Base (27) number system. In the Base (27) Specification Table 156 found in FIG. 20 the decimal numbers 0 to 26 are expressed as alpha-numeric symbols. Specific alpha symbols have been deleted from the normal 26 character alphabetic code set. The purpose of which is to insure that the random nature of a PIN code will not inadvertently create a word that might be offensive to some people. The numbers 1, 2 and 3 were also removed to avoid confusion with alpha character that look similar. As a further processing step (not shown) a word pattern filter could be used to reject PIN codes that might abstractly represent offensive words. This may be done using a look up table method.

FIG. 21 demonstrates how to express a Base (27) number in polynomial form and gives an example of how to convert a Base (27) number to a base (10) number. FIG. 22 gives an example of converting a Base (27) number to a base (2) number. The purpose of such a conversion is to determine the Word Size required for the index number to PIN conversion process. As can be seen in FIG. 22 the value Z represents the number of symbols required representing a binary word of n bits 164. Converting to a logarithmic form 166, Z can be directly computed. By Example with n=16 (bits) the number of Base (27) characters is 3.36495 which must be rounded up to 4 (there cannot be fractional characters) as shown by reference number 168. Equation 170 shows the relationship between the number constants in different base systems. It should be noted that it is also possible to define the word size for a PIN and then to proceed in a similar manner to determine the number of Base (27) characters to express the maximum value.

A desirable option when using a PIN code is to express the number in a printable graphic form that is machine-readable. Such a method is to use a QR code. A QR code (abbreviation for Quick Response code) is a matrix printable barcode (or two-dimensional code.) The code consists of black modules arranged in a square pattern on a white background. The information encoded may be text, a URL, or other data. QR Code (2D Code) contains information in both the vertical and horizontal directions, whereas a standard bar code contains data in one direction only. QR Code holds a considerably greater volume of information than a bar code.

Figure 23:
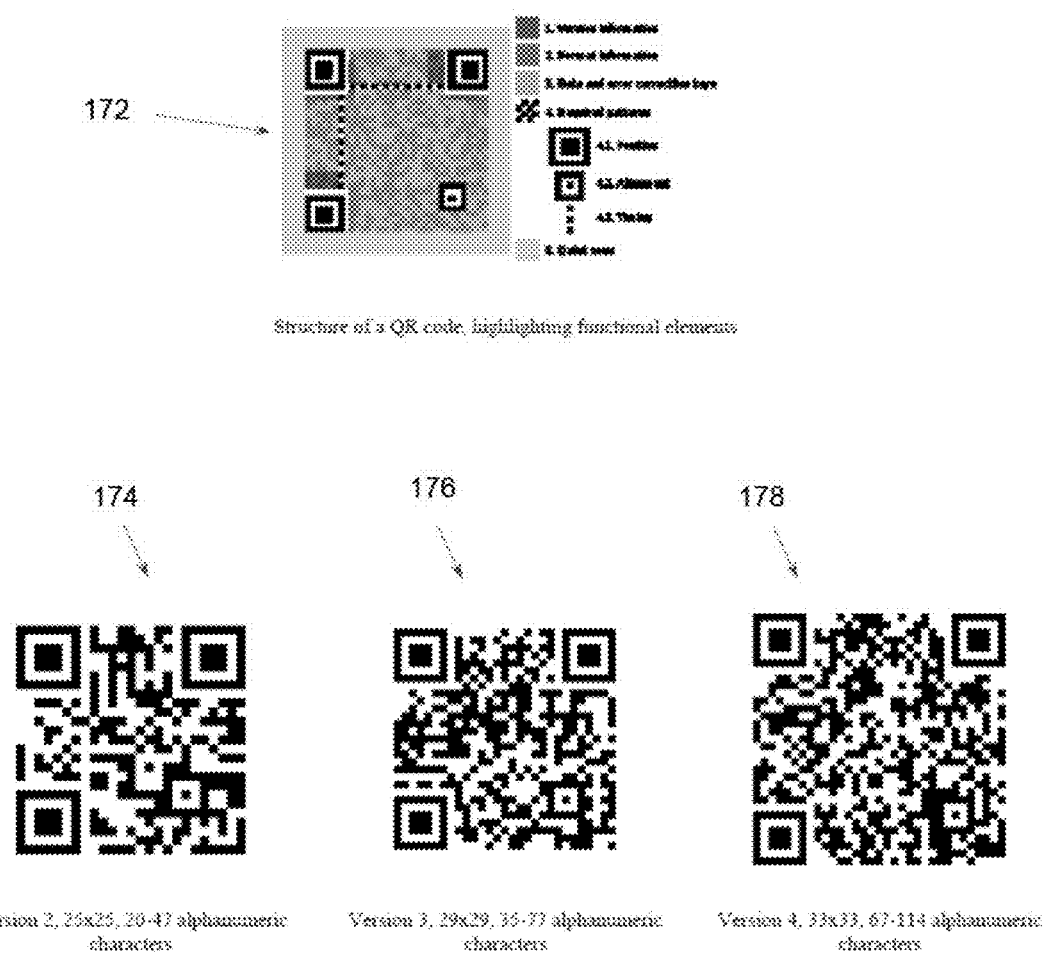
FIG. 23 depicts several examples of QR Codes.

The volume of information that can be stored in a QR Code is dependent on type of data (character set), version of the QR Code and error correction level. FIG. 23 172 shows the structure of a QR code, and highlights the functional elements. Items 174, 176 and 178 show 3 different versions of a QR code each having different coding densities.

Figure 24:
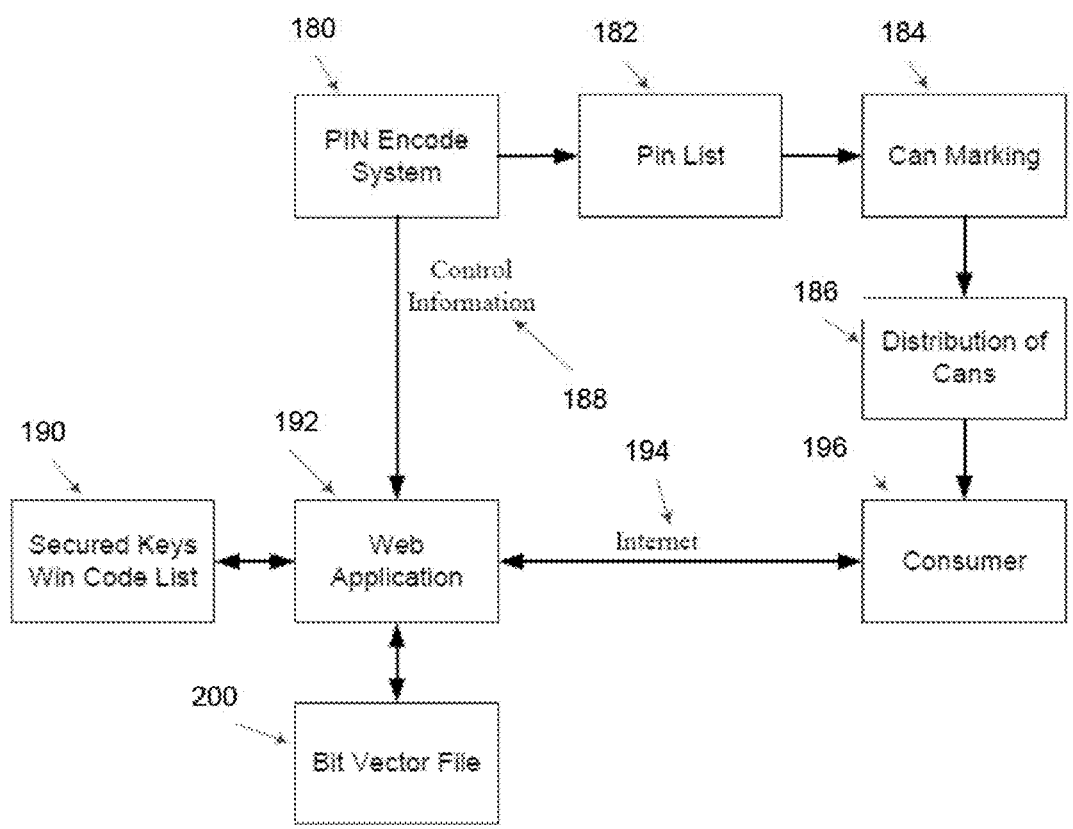
FIG. 24 is a block diagram showing the key elements of the system as potentially used in a canned beverage example.

FIG. 24 is an example of use for the PIN encode and decode methods of the invention described herein. The example is that of a Canned Beverage Manufacturer that wishes to provide a free gaming promotion to stimulate the purchase of their product. Printed on each beverage can is a PIN code. The customer using the Internet is permitted to enter the PIN code and potentially claim a prize. Once a PIN code is entered it cannot be re-entered. The system for PIN processing must also resist attempts and random false entries where a customer just makes up a PIN number and tries to win a prize. PIN Encode System 180 Generates "N" index numbers and then using the encryption method identified in the invention described herein converts the index numbers to Extended PIN numbers. The PIN Numbers are entered into a list 182 in Base (27) format and submitted to the manufacturing plant that produces the raw cans and labels them. Can Marking 184 is performed on each can, giving each can a unique PIN number. The cans are then distributed to retail outlets 186 to make them available to the Consumer 196. The consumer at their option accesses a Web Application 192 using a data network such as the Internet 194 and enters the PIN numbers on one or more cans that they have purchased. The Web Application 192 may implement the PIN validation process as described herein. The Extended PIN code will be verified as having originated from the authorized PIN encoding system 180 using the Secured Keys as found in block 190. If found to be authorized the PIN code will be converted to an index number and check against the Win Code List found in block 190. The PIN number is retired by setting the appropriate bit in the Bit Vector File 200 Win or lose, the customer receives a status from the Web Server.

Figure 25:
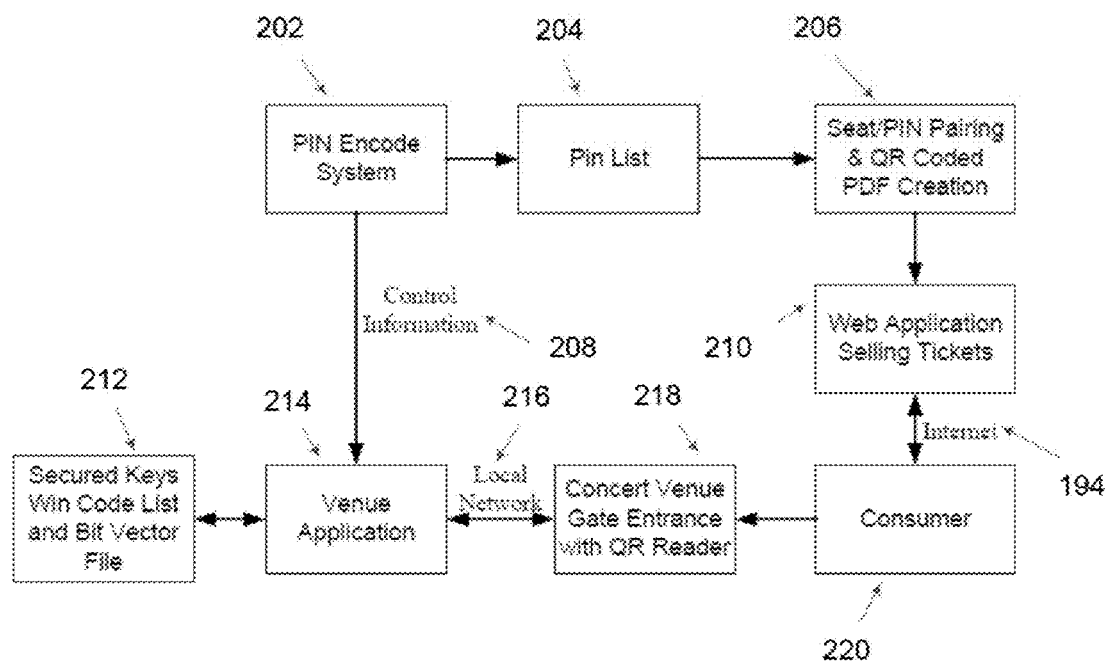
FIG. 25 is a block diagram showing the key elements of the system as potentially used in a Web Hosted Ticketed Concert Venue example.

FIG. 25 is an example of using the PIN encode and decode methods of the invention to implement a Web Hosted Ticketed Concert Venue. The system is configured to allow a customer 270 to purchase 1 or more seats at a concert venue using the Internet to facilitate the purchasing aspect. The system will generate "N" Extended PIN numbers 202 and place them into an electronic list 204. The value of "N" equals the total number of seats possible at the concert venue. The PIN numbers are then paired with a seating location and placed into a file associated with a ticket selling web application 210. The PIN/seat pair is QR coded into a PDF printable file. When a consumer 270 accesses the a Web Application Selling Tickets 210 using the Internet 194 they may pay for the tickets using a conventional method such as credit or debit card processing. They may also supply an email address. The Web Application 210 sends one or more QR coded tickets in the form of PDF files 206 to the email address they supplied to the Web Application 210. The consumer 270 proceeds to attend the concert venue, and provides the QR coded ticket(s) for entry. The Venue application 214 by way of a local network 216 processes the QR image and recovers the PIN code created in block 202. Using the Secured keys in block 212 the PIN code is validated. If authorized, the consumer 270 is permitted to proceed to their seat(s). Once validated a bit within the Bit Vector File found in block 212 is set to indicate the ticket has been processed, thereby stopping and possible counterfeit tickets from being processed in the future.

While certain embodiments of the present invention have been shown and described, it is to be understood that the present invention is subject to many modifications and changes without departing from the scope and sprit of the invention presented herein.

Figure 26:
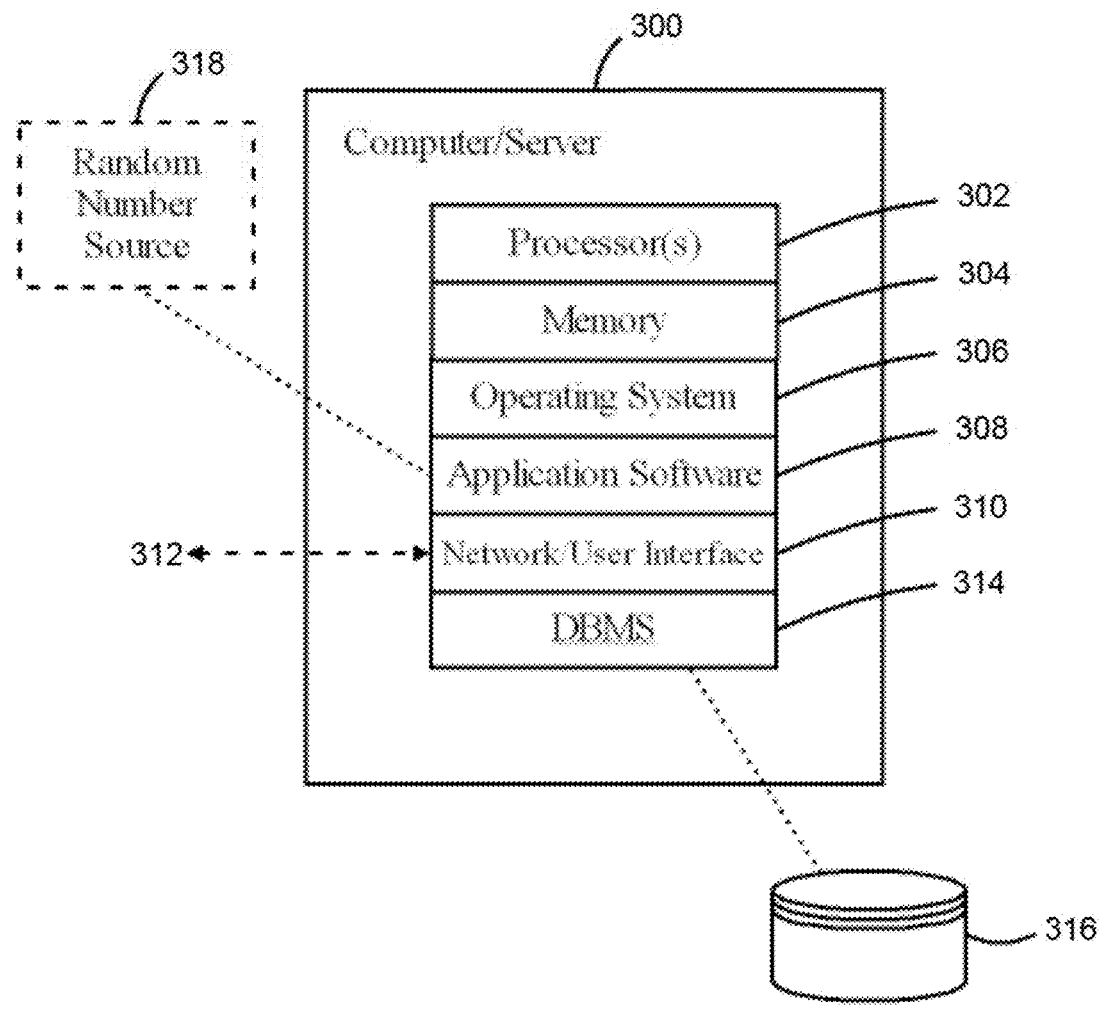
FIG. 26 is a block diagram of a computer/server configured for PIN generation.

FIG. 26 is a block diagram of a computer/server 300 configured for PIN generation as disclosed above. The computer/server 300 will typically include one or more processors 302 and various memories 304, e.g., random access memory, read only memory, disk memory and the like. The computer/server 300 may include an operating system 306 as is well known in the art. The computer/server 300 may include application software 308 configured with the functionality described in detail above. The computer/server 300 may also include a user interface and network interface 310 for communication with a user via a data network, the Internet or the like as shown by reference number 312. The computer/server 300 may also include database management software 314 that is coupled to a database 316. The computer/server 300 may also be coupled to a random number source 318. It should be understood that the random number source 318 may be implemented in hardware and/or software. The random number source 318 may be external (as shown) or integrated into the computer/server 300. It should be understood that the computer/server 300 may be implemented with a single machine or may be implemented in a distributed architecture using multiple machines as is well known in the art.

Figure 27:
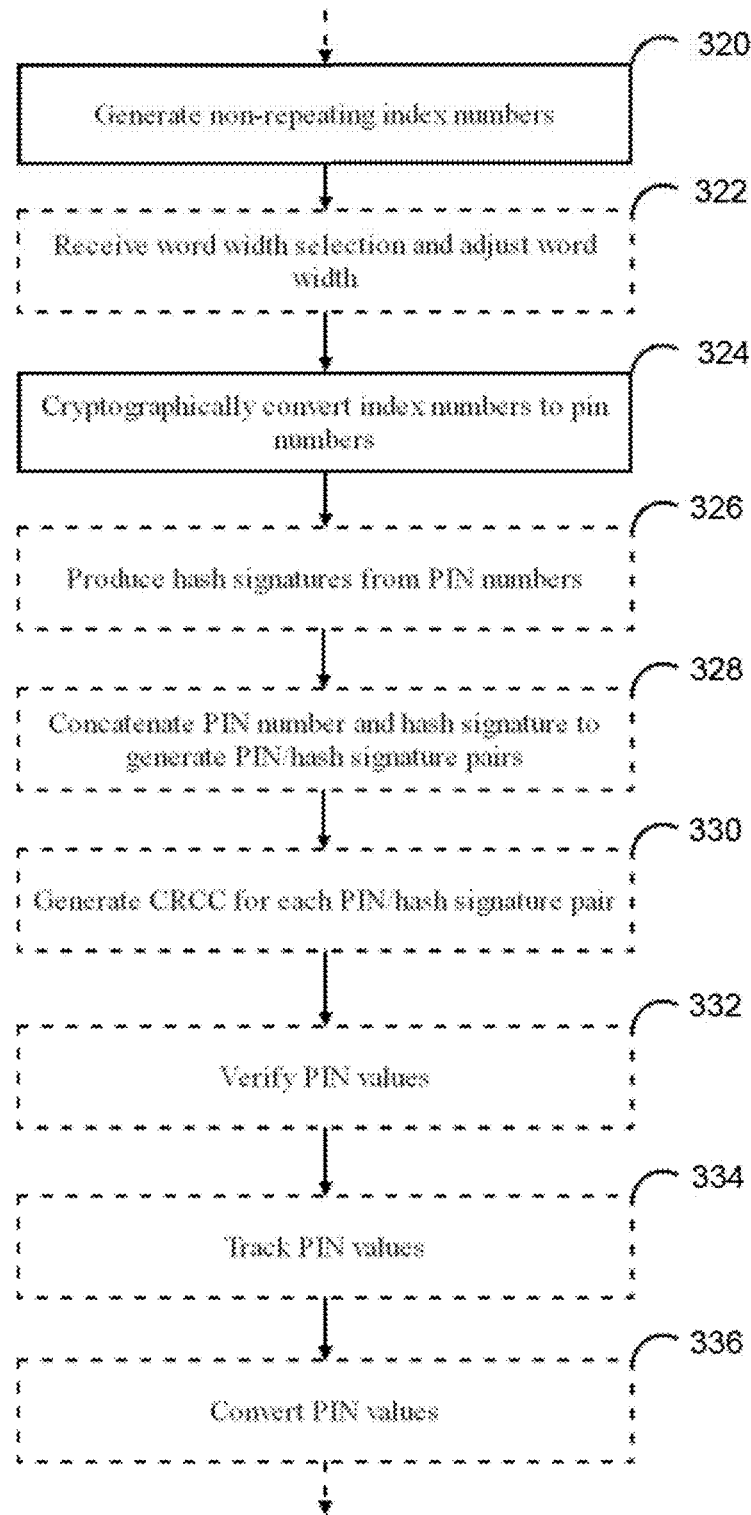
FIG. 27 is a flow chart showing general system operation.

FIG. 27 is a flow chart showing general operation of a PIN generation system. An index number generator (see FIG. 1, reference number 20) is configured to generate a plurality of non-repeating index numbers as shown by block 320. A symmetric secret key cryptography converter (see e.g., FIG. 1, reference number 22A) is configured to convert the index numbers to random PIN numbers as shown by block 324. The index number generator may be configured to generate an ordered set of index numbers and/or a sequential set of index numbers. The symmetric secret key cryptography converter may have a selectable word width as shown by block 322.

The system may include a secret key hash signature generator (see e.g., FIG. 13, reference number 90A) configured to produce a hash signature from at least a portion of the PIN numbers as shown by block 326. The system may also include a concatenator configured to concatenate the PIN numbers and the hash signatures to generate concatenated PIN number/hash signature pairs as shown by block 328. The system may include a CRCC generator configured to compute a CRCC remainder for the concatenated PIN number/hash signature pairs and a concatenator configured to concatenate the concatenated PIN number/hash signature pairs with the CRCC remainder creating a plurality of Extended PINs as shown by block 330.

The system may also include a verifier (see e.g., FIG. 1, reference number 40) configured to verify at least one of the PIN numbers as shown by block 332. A tracker may be used to track usage of at least one of the PIN numbers as shown by block 334. The tracker may be configured to track the usage of at least one of the PIN numbers based on a bit vector. At least a portion of the PIN numbers may be converted from one number base system to another number base system as shown by block 336. The PIN numbers may also be converted into printable QR codes.

It should be understood that many variations are possible based on the disclosure herein. Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

What is claimed is:

1. A personal identification number (PIN) generation and verification system comprising:
    an index number generator configured to generate a plurality set of ordered non-repeating index numbers having a defined range;
    a symmetric secret key encryption unit configured to convert the index numbers to random PIN numbers;
    a symmetric secret key decryption unit configured to convert one of the random PIN numbers into an unknown index number; and
    a verifier configured to verify the unknown index number by determining whether the unknown index number is within the defined range.

2. The system of claim 1 wherein the index number generator is configured to generate a sequential set of index numbers.

3. The system of claim 1 wherein the symmetric secret key cryptography converter has a selectable word width.

4. The system of claim 1 further comprising a secret key hash signature generator is configured to produce a hash signature from at least a portion of the PIN numbers.

5. The system of claim 4 further comprising a concatenator configured to concatenate the PIN numbers and the hash signatures to generate concatenated PIN number/hash signature pairs.

6. The system of claim 4 further comprising a cyclic redundancy check (CRC) generator configured to compute a CRC remainder for the concatenated PIN number/hash signature pairs and a concatenator configured to concatenate the concatenated PIN number/hash signature pairs with the CRC remainder creating a plurality of Extended PINs.

7. The system of claim 1 further comprising a tracker configured to track usage of at least one of the PIN numbers.

8. The system of claim 7 wherein the tracker is configured to track the usage of at least one of the PIN numbers based on a bit vector.

9. The system of claim 1 wherein at least a portion of the PIN numbers are converted from one number base system to another number base system.

10. The system of claim 1 where at least a portion of the PIN numbers are converted into printable QR codes.

11. A method of generating and verifying a personal identification number (PIN), the method comprising:
    generating a set of ordered non-repeating index numbers having a defined range;
    converting the index numbers to random PIN numbers using symmetric secret key encryption;
    converting one of the random PIN numbers into an unknown index number using a symmetric secret key decryption;
    verifying the unknown index number by determining whether the unknown index number is within the defined range.

12. The method of claim 11 wherein the index numbers are a sequential set of index numbers.

13. The method of claim 11 further comprising generating a hash signature from the at least a portion of the PIN numbers.

14. The method of claim 13 further comprising to concatenating the PIN numbers and the hash signatures to generate a concatenated PIN number/hash signature pair.

15. The method of claim 14 further comprising computing a cyclic redundancy check (CRC) remainder for the concatenated PIN number/hash signature pairs and concatenating each concatenated PIN number/hash signature pair with the CRCG remainder creating a plurality of Extended PINs.

16. The method of claim 11 further comprising tracking usage of at least one of the PIN numbers.

17. The method of claim 16 further comprising tracking the usage of at least one of the PIN numbers based on a bit vector.

18. The method of claim 11 further comprising converting at least a portion of the PIN numbers from one number base system to another number base system.

19. The method of claim 11 further comprising converting at least a portion of the PIN numbers into printable QR codes.

20. A non-transitory computer-readable storage medium containing a set of instructions for a processor, the processor executing the set of instructions and performing a method of generating and verifying a personal identification number (PIN), the method comprising:
    generating a set of ordered non-repeating index numbers having a defined range;

converting the index numbers to random PIN numbers using symmetric secret key encryption;

converting one of the random PIN numbers into an unknown index number using a symmetric secret key decryption;

verifying the unknown index number by determining whether the unknown index number is within the defined range.

\* \* \* \* \*